O. H. BARTHOLOMEW.
BEET HARVESTER.
APPLICATION FILED FEB. 3, 1914.
1,158,956.
Patented Nov. 2, 1915.
2 SHEETS—SHEET 1.
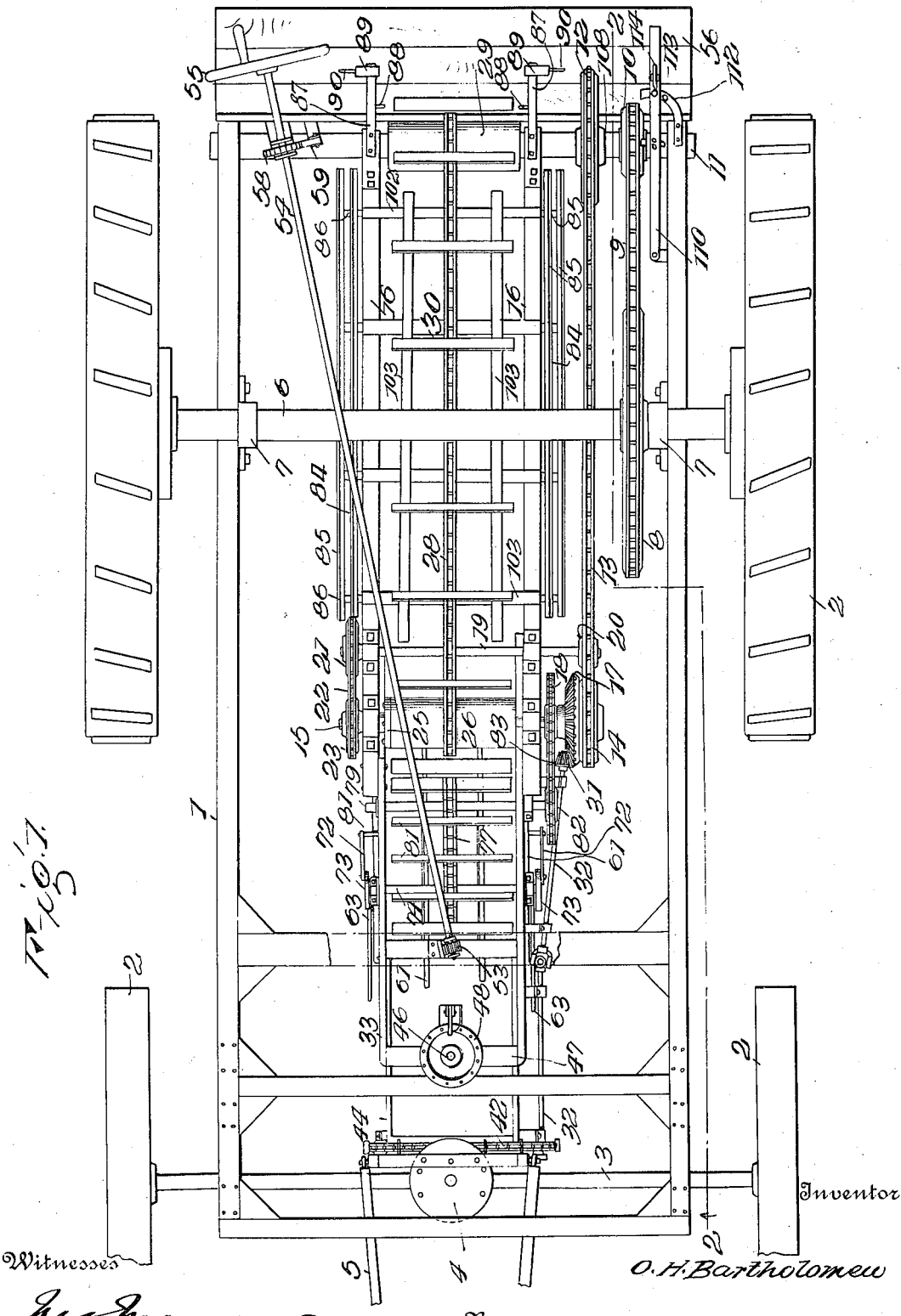

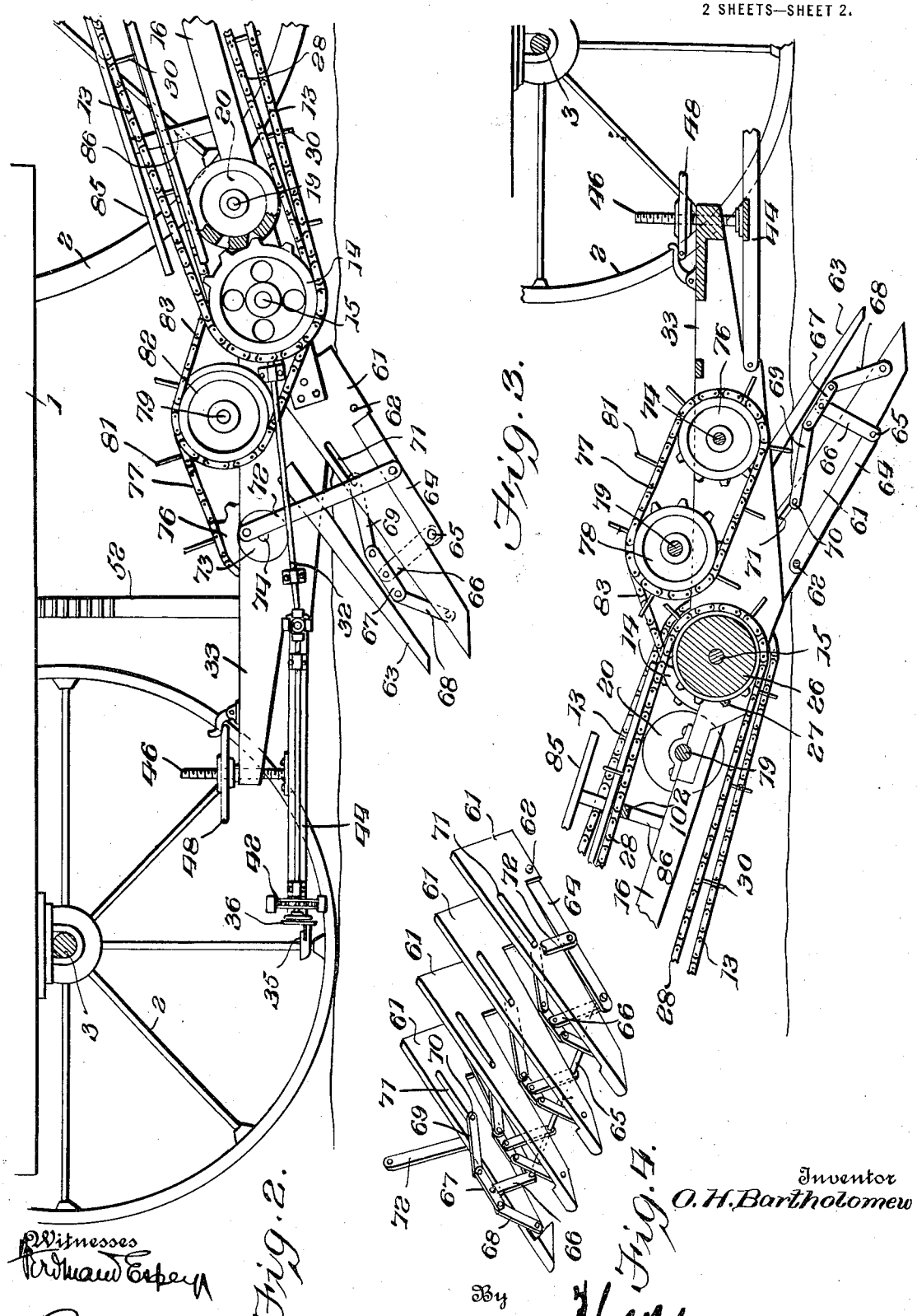

UNITED STATES PATENT OFFICE.

OHMER H. BARTHOLOMEW, OF BEARDSTOWN, ILLINOIS.

BEET-HARVESTER.

1,158,956.   Specification of Letters Patent.   Patented Nov. 2, 1915.

Application filed February 3, 1914. Serial No. 816,218.

*To all whom it may concern:*

Be it known that I, OHMER H. BARTHOLOMEW, citizen of the United States, residing at Beardstown, in the county of Cass and State of Illinois, have invented certain new and useful Improvements in Beet-Harvesters, of which the following is a specification.

This invention relates to machines for gathering beets, whereby as the machine is drawn over a field the roots or bodies will be withdrawn from the ground and conveyed to and delivered into a sack or other receptacle supported at the rear of the machine.

A further object of the invention is to provide novel means for removing the bodies from the ground and delivering them to the conveyer free of surplus dirt.

The invention also seeks to provide simple, compact and novel means for operating the several working parts and finally, the invention seeks to improve generally the construction and arrangement of the several parts of a machine for the stated purpose to the end that the durability and efficiency of the same may be increased while the cost of manufacture and up-keep will be kept to an economical basis.

The invention is illustrated in the accompanying drawings and consists in certain novel features which will be hereinafter first fully described and then more particularly pointed out in the claims following the description.

In the drawings: Figure 1 is a plan view of a machine embodying my improvements. Fig. 2 is a longitudinal vertical section of the uprooting mechanism taken on the line 2—2 of Fig. 1. Fig. 3 is a central longitudinal vertical section of the same, the machine being viewed from the side opposite that viewed in Fig. 2. Fig. 4 is a detail perspective view of the uprooting devices.

In carrying out my present invention, I employ a frame 1 which may be of any convenient or preferred construction which will provide the requisite strength and this frame is supported upon ground-wheels 2, the forward wheels being mounted upon an axle 3 which is connected to the frame by a fifth wheel 4 and is equipped with suitable hounds 5 for the attachment of shafts or a draft-pole. The rear ground wheels are loosely fitted upon an axle or driving shaft 6 mounted in suitable bearings 7 near the rear end of the frame, and these rear wheels will be connected with the axle or driving shaft by the usual escapement so that, when the machine is drawn forward, motion will be imparted to the axle or shaft and when the machine is moved rearwardly the wheels will turn upon the shaft without imparting motion thereto. These escapement devices are well-known and it is not necessary to illustrate or describe the same in detail herein.

Upon the rear axle or driving shaft 6 I secure a sprocket-wheel 8 which is connected by a sprocket chain 9 with a sprocket pinion 10 upon a counter-shaft 11 mounted in suitable bearings upon the frame 1 at the rear end of the same. A sprocket wheel 12 is secured upon this countershaft and this sprocket wheel is connected by a sprocket chain 13 with a sprocket-wheel 14 fixed upon a shaft 15 which is journaled in suitable bearings upon the side-bars 16 which are pivotally hung at their rear ends upon the countershaft 11 and constitute the frame for the conveyer. The said side-bars may be braced by cross-bars at intervals, if so desired. The shaft 15 also carries a bevel-pinion or gear wheel 17 disposed between the sprocket-wheel 14 and the frame 16 and between the said bevel gear wheel or pinion and the said frame is a sprocket-wheel 18, as shown. A transmission shaft 19 is mounted in suitable bearings upon the side-bars or frame 16 in rear of the shaft 15 and this shaft carries at one end a disk or wheel 20 provided in its periphery with sockets or recesses adapted to be engaged by the sprocket-teeth on pinion 14 so that the shaft 19 will be set in motion by the said sprocket-pinion. Upon the opposite end of the shaft 19 is secured a sprocket-wheel 21 which is connected by a chain 22 with a sprocket-wheel 23 which is loosely mounted upon the adjacent end of the shaft 15 and has an elongated hub provided at its inner end with an annular flange or collar 25 which is secured directly to the end of a drum or roller 26. The elongated hub is mounted in a suitable bearing upon the side-bar 16 so that the motion of the parts will be steady and vibration of the same will be prevented, and it will be readily understood that through the described gearing the drum or roller 26 will be rotated from and about the shaft 15 but in an opposite direction to the rotation of the said shaft. The said drum or roller 26 is provided with an annular series of sprocket-teeth 27 at about its center and an endless chain 28 passes around and engages the said sprocket teeth so as to receive motion from the drum or roller. This chain also passes around a roller 29 carried by the countershaft 11 at the center thereof and blades or cross bars 30 are secured to the said chain so as to engage behind the beet bodies and cause the same to move upwardly and rearwardly in the operation of the machine as will be readily understood.

The bevel gear wheel 17 meshes with a bevel pinion 31 fixed upon the rear end of a shaft 32 which is journaled in suitable bearings carried by the side-bars 16 and a frame 33 connected to and projecting forwardly from the said side-bars. The front end of the shaft 32 is equipped with a crank-disk 36 and a sprocket wheel, the crank disk being operatively connected with the cutter 35 so that, as the shaft rotates, the tops of the beets will be severed.

The side-bars or frame 33 are secured at their rear ends to the forward ends of the side-bars 16, journal boxes being provided upon the rear ends of the bars 33 to accommodate the shaft 19. At intermediate points of the length of the said side-bars of the frame 33 is secured a rack-bar 52 which rises through the main frame and is engaged by a pinion 53 sutably mounted on the main frame and operated by a shaft 54 which extends to the rear of the machine and is there equipped with a hand-wheel or other operating device, indicated at 55, so that the said shaft may be conveniently operated by a person standing upon the platform 56 which is carried by brackets or hangers 57 secured to and depending from the main frame. The shaft 54 is equipped near its rear end with a ratchet-wheel 58 which is engaged by a dog or pawl 59 mounted upon the main frame so that after the said shaft has been manipulated to adjust the operating mechanism to the desired height or depth, it will be held against retrograde movement and the parts maintained in the position in which they may be set. To relieve the strain upon the dog 59 and the ratchet-wheel or disk 58, I may provide an adjustable collar or stop upon the rack-bar 52 adapted to rest upon the cross-bar of the main frame so as to prevent the said rack-bar dropping below the frame after it has been properly adjusted.

The uprooting members are carried by the side-bars or frame 33 and comprise a series of blades, prongs or fingers 61 which are supported by a rod or shaft 62, the outer prongs or blades being secured rigidly to the side-bars 33. The active prongs or blades are disposed between the said side-bars 33 and to the outer sides of the said bars I secure the inactive prongs or guard-fingers 63 which are so disposed as to pass through the ground in advance of the active prongs or blades and thereby loosen the soil at the sides of the beets and prevent the beets falling to one side and out of the path of the active uprooting blades. Pivotally mounted upon the rod 62 are levers 64, the front ends of said levers being connected by a rod 65, as shown most clearly in Fig. 4. Immediately adjacent each blade or prong 61, a link 66 is fitted to the said rod 65 and extends upward therefrom to a point above the said blade or prong, the upper end of the link being pivoted to a cross head 67 having its front end pivoted to the upper rear end of a vibratory link or arm 68 which is pivoted at its front end to the immediately adjacent prong or blade. The rear end of the cross head 67 is pivoted in a similar manner to a rearwardly extending link or arm 69 which is provided at its rear end with a pin 70 playing in a longitudinal slot 71 formed in the adjacent blade or prong. The levers 64 are connected by pitmen 72 with crank arms or disks 73 provided at the ends of a shaft 74 mounted in suitable bearings upon the bars 33. This shaft 74 carries a sprocket-wheel 76 at about its center and a sprocket chain 77 is trained around the said sprocket wheel and a similar sprocket wheel 78 which is carried by a shaft 79 journaled in bearings provided therefor upon the upper edges of the side-bars 33 in rear of the shaft 74 as clearly shown. The chain 77 is equipped at intervals with cross-bars or blades 81 which, by the travel of the chain, are brought against the beet bodies forced from the ground by the prongs 61 and the devices mounted thereon so that the said bodies will be moved rearwardly and delivered to the conveyer consisting of the chain 28 and the cross-bars or blades 30. The shaft 79 is equipped at its outer end with a sprocket-wheel 82 around which and the sprocket 18 a chain 83 is trained. It will thus be seen that the chain 77 and the beet bodies shaking mechanism comprising the blades 61 and the parts mounted thereon, are all operated from the shaft 15, bearings being provided on the frame 33 for said shaft so that the proper relation of the several shafts will be maintained.

It is thought the action of the several instrumentalities just described will be readily understood. As the machine is drawn forward over the field the motion of the driving shaft 6 will be transmitted through the sprocket-wheel 8 and chain 9 to the sprocket-pinion 10 and the counter-shaft 11, from which it will be transmitted through the sprocket-wheel 12 and the chain 13 to the sprocket-wheel 14 and the shaft 15. The rotation of the shaft 15 will be transmitted directly through the gearings 17 and 31 to the shaft 32, and the cutter and the transverse top conveyer thereby actuated. The rotation of the shaft 15 will also be transmitted through the sprocket wheel 18, the chain 83 and the sprocket pinion 82 to the shaft 79 and the sprocket-chain 77 will be actuated so as to transmit the rotation of the said shaft 79 to the shaft 74. As the said shaft 74 rotates, the cranks 73 will be actuated so that the pitmen 72 will be reciprocated and the levers 64 vibrated in vertical planes. The movement of the levers 64 will be transmitted directly to the rod 65 and the links 66 carried by the said rod will be thereby caused to move upwardly and downwardly and thereby actuate the cross heads 67. When the cross heads 67 are in their lowermost positions they will lie approximately flush with the upper edges of the respective adjacent blades or prongs 61 so that as the said blades or prongs move forwardly through the ground they will pass under and at the sides of the beet bodies without coming into actual contact with the sides of the said bodies. The movement of the parts will be so timed that after the prongs are directly under the bodies and the soil has been thereby loosened the cross heads 67 will be raised and the beet bodies thereby uprooted so that they will fall backward upon the upper edges of the blades or prongs in rear of the cross heads where they will be engaged by the blades 81 and moved to the rear conveyer, the blades or cross-bars 30 of which will then engage them and carry them upwardly and rearwardly to the rear of the machine where they will fall into a receptacle provided adjacent the rear end of the conveyer.

The uprooting mechanism, comprising the cross heads 67 and the links or arms connected to the front and rear ends of said cross-heads, will operate smoothly and easily and is so attached to the blades or prongs that it will always be in proper operative position. The forward links or arms 68 are pivoted to the blades so that they cannot be dislodged and will prevent vibration of the cross heads as they are raised and lowered to act upon the beet bodies. The rear links or arms 69, having a pin-and-slot connection with the respective blades, will accommodate the incidental swinging movement of the cross heads and at the same time will hold them in their proper positions relative to the respective blades.

In order to guard as far as possible against loss of the beets due to movement of the same transversely upon the conveyer, I provide the side frames 84 which diverge upwardly from the conveyer frame or side bars 16 and consist of longitudinal rails 85 and brackets 86 connecting the same to the side bars 16 of the conveyer frame. By providing these side frames the beet bodies are permitted to travel freely upon the conveyer without liability of being bruised through being confined within excessively narrow limits, and at the same time should the bodies tend to roll off the sides of the conveyer these side frames will arrest such transverse movement and prevent loss of the beets. The brackets 86 are secured to and rise from the side bars 16 and are connected by cross bars 102 which support longitudinal bars or rods 103 upon which the blades 30 ride, said bars or rods 103 being sufficiently thick to hold the chain 28 above the cross bars 102. I thus provide a support for the beets while the dirt which may be taken up with the beets may fall through the conveyer to the ground.

To the rear ends of the sides of the conveyer frame I secure rearwardly projecting arms or bars 87 and on the said bars I provide hooks 88 adjacent the rear end of the main frame over which the upper end of a sack may be engaged. The sack is then stretched somewhat rearwardly so as to lie close against the outer ends of the bars 87 and clamping plates 89 are engaged over the mouth of the sack so as to hold the sack against the said bars 87, the said clamping plates being drawn tightly against the said bars by cams 90 fulcrumed in the outer ends of the plates and adapted to bear against the outer sides of the bars as shown clearly in Fig. 6.

The machine is drawn over a field as before stated and the operator or operators will stand upon the platform 56 at the rear of the machine so as to drive the team and also adjust the mechanism upwardly and downwardly accordingly as it is to enter the ground or is to be raised above the same to permit the removal of the machine from the field, as will be readily understood. The beets will be delivered by the rear conveyer directly into a sack supported at the rear end of the main frame and when the sack is filled it is removed and an empty sack substituted therefor, the operator subsequently tying the filled sack and placing the same upon the ground so that it may be subsequently gathered. The forward motion of the machine, as before stated, will cause the links 66 and the parts connected therewith to rise and fall so that at regular intervals the cross heads will be moved upwardly so as to loosen the beet bodies which will thereupon fall over upon the prongs and then be moved to the rear of the machine. As the beet bodies fall over upon the prongs or blades the loose dirt upon the beet bodies drops therefrom and any dirt which may tend to adhere to the bodies will be shaken from the same during the subsequent travel thereof toward the rear of the machine.

It will be readily noted that the several parts of my apparatus are compactly arranged and are positively driven so that the machine will operate easily and efficiently.

The sprocket-wheel 10 is loose on the shaft 11 and I provide means for locking it to the shaft in connection wtih a spacing collar or sleeve disposed between the main frame and the sprocket whereby the sprocket will be prevented from sliding outwardly on the shaft. At the inner side of the sprocket, a spacing ring 108 is fitted around the shaft between said sprocket and the sprocket 12 so that the sprocket 10 will be held against all axial movement. The means for locking the sprocket 10 to the shaft is carried by the spacing collar at the outer side of the sprocket and connected with a lever 110 which is fulcrumed on the side of the main frame and projects rearwardly therefrom over a bracket 112 secured to the frame. This bracket is provided with spaced openings 113 and a latch 114 is mounted on the lever and carries a pin adapted to engage one of said openings and thereby hold the lever in a set position. When the machine is to operate, the lever is moved inwardly thereby carrying the locking mechanism into engagement with the sprocket 10 so that it will be locked to the shaft 11 and set the shaft in motion. If the machine is to be moved to another field, the lever is moved outwardly thereby releasing the sprocket so that it will be free on the shaft and the shaft will not rotate.

Having thus described the invention, what is claimed as new is:—

1. In a machine for the purpose set forth, the combination of a frame, blades secured to and depending therefrom, vertically movable cross heads mounted adjacent the blades, and means for operating said cross heads.

2. In a machine for the purpose set forth, the combination of a frame, blades secured to and depending therefrom, cross heads disposed adjacent the blades, links pivoted to and depending from the cross heads, a connecting rod carrying the said links, and means for vibrating said rod.

3. In a machine for the purpose set forth, a series of blades secured to and depending therefrom, cross heads disposed adjacent the blades, and links pivoted to and depending from the said cross heads, a connecting rod carrying said links, means for vibrating said rod, and links pivoted to the front and rear ends of the cross heads respectively, one of said links being pivoted to the adjacent blade and the other of said links having a sliding connection with the said blade.

4. In a machine for the purpose set forth, the combination of a frame, a series of blades secured to and depending therefrom, levers pivoted to some of said blades and extending longitudinally of the same, a rod carried by the front ends of said levers, links carried by and rising from said rod, cross heads pivoted to the upper ends of said links, arms pivoted to the said cross heads and connected with the respective blades, a crank-shaft mounted upon the frame, means for rotating said crank-shaft, and pitmen connecting said crank-shaft with the said levers.

5. In a machine for the purpose set forth, the combination of a frame, a series of blades secured to and depending from the said frame, vertically movable members carried by said blades, and prongs secured to and depending from the sides of the frame in advance of the said blades.

In testimony whereof I affix my signature in presence of two witnesses.

OHMER H. BARTHOLOMEW. [L. S.]

Witnesses:
J. F. JONES,
LULU DUNN.